US011522802B2

(12) United States Patent
Bonig et al.

(10) Patent No.: US 11,522,802 B2
(45) Date of Patent: *Dec. 6, 2022

(54) ENFORCEMENT OF LATENCY DETERMINISM ACROSS A COMPUTER NETWORK

(71) Applicant: Chicago Mercantile Exchange Inc., Chicago, IL (US)

(72) Inventors: Zachary Bonig, Skokie, IL (US); David Alan Lariviere, Chicago, IL (US); Suchith Vasudevan, Chicago, IL (US); Brian Alvin Bourn, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/200,261

(22) Filed: Mar. 12, 2021

(65) Prior Publication Data
US 2021/0203609 A1 Jul. 1, 2021

Related U.S. Application Data

(63) Continuation of application No. 16/846,504, filed on Apr. 13, 2020, now Pat. No. 10,986,031, which is a
(Continued)

(51) Int. Cl.
*H04L 51/18* (2022.01)
*H04L 47/283* (2022.01)
(Continued)

(52) U.S. Cl.
CPC .......... *H04L 47/283* (2013.01); *G06Q 40/04* (2013.01); *H04L 43/0858* (2013.01); *H04L 51/18* (2013.01); *H04W 4/023* (2013.01)

(58) Field of Classification Search
CPC ... H04L 43/0858; H04L 51/18; H04L 47/283; G06Q 40/04; G06Q 40/02; H04W 4/023
(Continued)

(56) References Cited

U.S. PATENT DOCUMENTS 6,278,982 B1 8/2001 Korhammer et al.
7,127,422 B1 10/2006 Bundy
(Continued)

FOREIGN PATENT DOCUMENTS

EP 3131049 A1 2/2017
WO 2014043420 A1 3/2014

OTHER PUBLICATIONS

Ana Avramovic, Phil Machintosh "Odd Lot (Ab)users" Credit Suisse—p. 1-5. Feb. 12, 2014.
(Continued)

*Primary Examiner* — Frantz B Jean
(74) *Attorney, Agent, or Firm* — Lempia Summerfield Katz LLC

(57) ABSTRACT

The disclosed embodiments relate to implementation of a transaction processing system having improved equity among the communications paths between the ingress/egress points of the trading system network, where electronic data transaction messages originated from, or are destined, for different sources/destinations, effectively enter or exit the trading system, to/from the transaction processing component thereof, i.e., the match engine, market data feed generator, where those messages are ultimately processed and outbound messages reflective thereof are generated. The disclosed embodiments attempt to compensate for variances in latencies as between different network communications routes between the electronic ingress/egress points of the
(Continued)

electronic trading system and the internal processing components which implement the functions of the trading system.

27 Claims, 4 Drawing Sheets

Related U.S. Application Data continuation of application No. 16/158,726, filed on Oct. 12, 2018, now Pat. No. 10,659,379.

(60) Provisional application No. 62/668,353, filed on May 8, 2018.

(51) Int. Cl.
*G06Q 40/04* (2012.01)
*H04L 43/0852* (2022.01)
*H04W 4/02* (2018.01)

(58) Field of Classification Search
USPC .......................................................... 709/223
See application file for complete search history.

(56) References Cited

U.S. PATENT DOCUMENTS

| | | | |
|---|---|---|---|
| 7,412,415 B2 | 8/2008 | Stanley | |
| 7,461,026 B2 | 12/2008 | Schluetter | |
| 7,904,371 B2 | 3/2011 | Davidowitz et al. | |
| 9,280,791 B2 | 3/2016 | Rooney | |
| 9,929,743 B1 | 3/2018 | Acuña-rohter | |
| 9,941,950 B2 | 4/2018 | Babich | |
| 2004/0068461 A1 | 4/2004 | Schluetter | |
| 2005/0027635 A1 | 2/2005 | Monroe et al. | |
| 2005/0074033 A1 | 4/2005 | Chauveau | |
| 2012/0041894 A1 | 2/2012 | Glodjo et al. | |
| 2015/0073967 A1 | 3/2015 | Katsuyama et al. | |
| 2017/0103460 A1 | 4/2017 | Golubovsky | |
| 2018/0047099 A1 | 2/2018 | Bonig | |
| 2018/0075530 A1 | 3/2018 | Kavanagh | |
| 2018/0191624 A1 | 7/2018 | Haynold | |
| 2019/0205980 A1* | 7/2019 | Pierce | G06Q 40/04 |
| 2019/0287171 A1* | 9/2019 | Parmar | G06F 21/10 |
| 2019/0317838 A1* | 10/2019 | Kavanagh | G06F 9/546 |
| 2020/0320628 A1* | 10/2020 | Bauerschmidt | G06Q 40/04 |

OTHER PUBLICATIONS

Andreas Lohr and Sebastial Neusub, T7 Infrastructure and Latency, Sep. 27, 2018.
Balla, et al., Low Resource FPGA-based Time to Digital Converter, Jun. 2012, IEEE Transaction on Instrumentation and Measurement.
Cliff, Dave, Dan Brown, and Philip Treleaven. "Technology trends in the financial markets: A 2020 vision." Foreshight Driver Review, DR3 22.03 (2011).
Cont, Rama, and Arseniy Kukanov. "Optimal order placement in limit order markets." Quantitative Finance 17.1 (2017): 21-39.
European Search Report, from European Application No. 19173381, dated Jun. 28, 2019, EP.
Macieji Lipinski, White Rabbit, Ethernet-based Solution for Sub-ns Synchronization and Deterministic, Reliable Data Delivery, Jul. 15, 2013, IEEE Plenary Meeting Geneve.
"Automated and ultra-low-latency management of orders inaggregated markets" CQG—p. 1-4. Accessed Mar. 19, 2016.www.cqg.com/Docs/Exec_MarketAggregation.pdf.
"Navigating the Future of Smart Order Routing" DWT—p. 1-7. Oct. 5, 2009. http://www.dealingwithtechnology.com/.
"Server-Side Aggregation Automated and ultra-low-latency management of orders in aggregated markets." CQG—p. 1-2. Accessed Mar. 19, 2016.www.cqg.com/Docs/ServerSideAggregation.pdf.

* cited by examiner

ENFORCEMENT OF LATENCY DETERMINISM ACROSS A COMPUTER NETWORK

RELATED APPLICATIONS

This application claims priority to and the benefit as a continuation of U.S. patent application Ser. No. 16/846,504, filed Apr. 13, 2020, entitled, "ENFORCEMENT OF LATENCY DETERMINISM ACROSS A COMPUTER NETWORK", now U.S. Pat. No. 10,986,031, issued Apr. 20, 2021, which claims priority to and the benefit as a continuation of U.S. patent application Ser. No. 16/158,726, filed Oct. 12, 2018, entitled, "ENFORCEMENT OF LATENCY DETERMINISM ACROSS A COMPUTER NETWORK", now U.S. Pat. No. 10,659,379, issued May 19, 2020, which claims the benefit of the filing date under 35 U.S.C. § 119(e) of U.S. Provisional Application Ser. No. 62/668,353, filed May 8, 2018, the entirety of all which are incorporated by reference herein and relied upon.

BACKGROUND

A financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand-based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

A market data feed, referred to as market data or market feed, is a compressed or uncompressed real time (with respect to market events), or substantial approximation thereof, data/message stream provided by the Exchange directly, or via a third-party intermediary. A market data feed may be comprised of individual messages, each comprising one or more packets or datagrams, and may carry, for example, pricing or other information regarding orders placed, traded instruments and other market information, such as summary values and statistical values, or combinations thereof, and may be transmitted, e.g. multi-casted, to the market participants using standardized protocols, such as UDP over Ethernet. More than one market data feed, each, for example, carrying different information, may be provided. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order on the order book to rest;

(2) The matching engine creates an update reflecting the opportunity and sends it to a feed engine;

(3) The feed engine multicasts it to all of the market participants to advertise the opportunity to trade;

(4) The market participants evaluate the opportunity and each, upon completion of their evaluation, may or may not choose to respond with an order responsive to the resting order, i.e. counter to the resting order;

(5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

Electronic trading systems ideally attempt to offer a more efficient, fair and balanced market where market prices reflect a true consensus of the value of traded products among the market participants, and which minimize, if not eliminate unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

In addition to efficiency, fairness and equity, electronic trading systems further provide significant performance improvements allowing for rapid high-volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed. Throughput may be measured as the maximum number of orders or trades per second that the electronic trading system can support, i.e. receive and acknowledge, receive and match, etc.

Generally, market participants desire rapid market data updates, low latency/high throughput order processing, and prompt confirmations of their instructions to allow them to: competitively, frequently and confidently evaluate, react to, and capitalize upon or, conversely, avoid, discrete, finite, fast moving/changing or ephemeral market events; leverage low return transactions via a high volume thereof; and/or otherwise coordinate, or synchronize their trading activities with other related concerns or activities, with less uncertainty with respect to their order status. Higher volume capacity and transaction processing performance provides these benefits as well as, without detrimentally affecting that capacity or performance, further improves market access and market liquidity, such as by allowing for participation by more market participants, the provision of additional financial products, and/or additional markets therefore, to meet the varying needs of the market participants, and rapid identification of additional explicit and implicit intra- and inter-market trading opportunities. The Exchange benefits, for example, from the increased transaction volume from which revenue is derived, e.g. via transaction fees.

Current electronic trading systems already offer significant performance advantages. However, increasing transaction volumes from an increasing number of market participants, implementation by some market participants of algorithmic and/or high frequency trading methodologies whereby high speed computers automatically monitor markets and react, usually in an overwhelming manner, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access.

Accordingly, high performance electronic trading systems need to assure transactional determinism under increasing loads while providing improved trading opportunities, fault tolerance, low latency processing, high volume capacity, minimal impact risk mitigation and market protections, as well as equitable access to information and opportunities.

DETAILED DESCRIPTION

Figure 1:
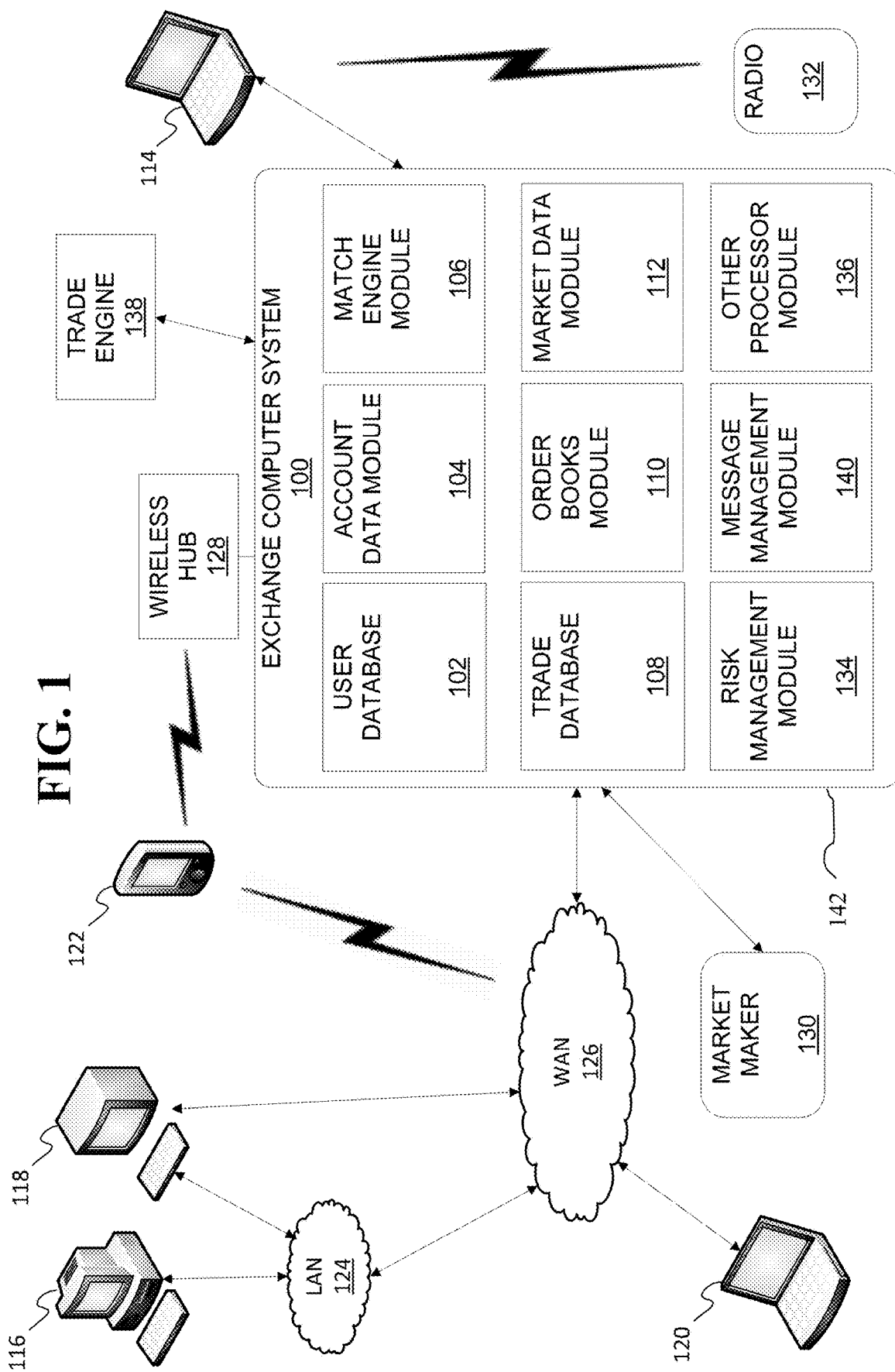
FIG. 1 depicts an illustrative electronic trading system that may be used to implement aspects of the disclosed embodiments.

The disclosed embodiments relate to implementation of a transaction processing system, e.g. an electronic trading system, which may also be referred to as a trading system architecture, having improved equity among the communications paths between the ingress/egress points of the trading system network, where electronic data transaction messages originated from, or are destined, for different sources/destinations, effectively enter or exit the trading system, to/from the transaction processing component thereof, i.e., the match engine, market data feed generator, where those messages are ultimately processed and outbound messages reflective thereof are generated. That is, the disclosed embodiments attempt to compensate for variances in latencies as between different network communications routes between the electronic ingress/egress points of the electronic trading system and the internal processing components which implement the functions of the trading system. Accordingly, an incoming transaction message which is communicated along one route is not unfairly penalized as to its processing priority by, for example, the match engine, as compared to another transaction message which is communicated along a different route which has a lower latency, and messages reflective of that processing are not unfairly delayed en route back to the submitting traders via different routes/egress points.

In particular, the disclosed embodiments describe an approach for enforcing latency determinism across a computer network by timestamping at the origination subnetwork, such as the network edge or internal processing component, and enforcing a total travel time, i.e. a minimum/standard latency, on network traffic before allowing entry into a target subnetwork, i.e. in the internal processing component for inbound transactions and the network edge for outbound transactions.

As noted elsewhere herein, currently, financial exchanges and their customers are frequently co-located in the same data centers. Customers connect to an exchange through a series of Local Area Networks or Wide Area Networks. As a side effect of the physical layouts of networks within datacenters, it is possible and even likely for customer servers to experience different latency to the Order Matching Subnetwork, or other internal processing components, of the exchange. The causes of the varying latencies fall broadly into two main categories; physical (static) differences and routing (dynamic) differences. The physical differences in a path are constant and exchanges can equalize them by addressing differences, for example, in fiber length or replacing switching infrastructure. Routing differences, however, can vary as, for example, congestion or routing of packets constantly change.

These differences in packet latency can result in information inequality among market participants, providing customers with faster paths in and out of the exchange which presents an advantage as they receive information from the market sooner, and can send orders to the market faster along their shorter path. While the exchange may, as will be described, not have control over the infrastructure outside of its systems/network, in the interests of determinism and fairness for messages entering into the market/trading system, it may be desirable to equalize latency across all connections.

As will be described, traffic flow in this context may, in one embodiment, be thought of as flowing from an origination device or subnet to a target or destination device or subnet, wherein the origination and destination depend on the direction of the network traffic. For example, when considering incoming data transaction messages, e.g. orders to trade, the origination subnet may be the gate, switch or router implemented by the electronic trading system to interconnect with external network infrastructure, referred to below as the edge, and the destination subset may include the internal processing module to which that incoming data transaction message will be routed, via internal network infrastructure, to be acted upon, i.e. where the payload of the of the message is processed. In terms of outgoing message traffic, for example, the origination subnet may be the internal processing component, which generates data indicative of the processing of the message, and the destination subnet is the network edge. To ensure all traffic spends the same amount of latency in transit, the total travel time may be first seamlessly detected from origination to destination without imposing any substantially extra delays. Once that time is known, a variable waiting period may be enforced at the destination subnetwork in order to standardize the travel time/latency for all packets flowing to the target.

For example, in one embodiment, a standardized delay/latency may be decided upon for the entire network. Alternatively, different portions of the network may have specific standardized delays/latencies applied. In general, the information on the current times/latencies can be found from current data resources, such as traffic monitors, etc., and then a business level decision may be made to define a standard benchmark for the network. For example, the standardized delay/latency may be set to be the longest measured delay, e.g. "high water mark," of any network path in the system. It will be appreciated that, as will be described below, the dynamic component of the latency of any network path will result in variations is measured latencies. Accordingly, for example, the path with the longest delay, as well as the magnitude thereof, may change over time. According, statistical analysis may be applied to determine the statistically longest latency path and the magnitude of that latency. As will be described, the standardized delay may be periodically reevaluated, either manually or automatically, based on current and/or historical conditions, and adjusted as warranted.

For example, the standardized latency may comprise a fixed minimum transit time/latency computed/derived based on an average observed measured transit time/latency (e.g. the median time is 5 ms, so all transits must be 5 ms minimum). Alternatively, the standardized latency may be computed as the minimum observed latency with an adjustable floor, e.g. adjusted to 75, 80, 90%, etc., of the observed latencies (or average/median thereof). Alternatively, the standard latency, or high watermark value thereof, may be periodically recomputed based on recent observed latency values, e.g. the most recent X minutes or hours of observed latencies. It will be appreciated that the historical window over which latency values are observed to compute/derive the standard latency may be fixed or dynamic. For example, the highwater mark may be adjusted periodically, e.g. every hour (or other unit of time), based on congestion/volume, rather than transit times (i.e. as traffic increases, the water mark rises to ensure that the network can handle the volume). In another embodiment, a sliding scale may be implemented, e.g. the highwater mark begins at some predefined value (e.g. 1 ms) and increases whenever a certain percentage of messages has exceeded 150% of that value (for example, if 100 messages are observed with a transit time above 1.5 ms, that becomes the new value). Similarly, the high watermark mark can be moved back down if the inverse happens. It will be appreciated that minimizing the standard latency improves the overall performance of the system.

Further, in order to enforce the network latency across all customer connections in the datacenter there may be two stages in either direction of communication: 1. At the subnetwork edge of the origin of a data packet, the packet will be timestamped; and 2. At the destination subnetwork edge, the packet's network timestamp will be checked and the packet delayed long enough to enforce the predetermined network latency In one example embodiment, for stage one, all origination traffic may receive a connection to an exchange-owned network switch with a standardized length cable to connect to it. This switch would automatically inject timestamps into packets for when the packet was seen at the switch. In order to deterministically and quickly inject the timestamps into a packet, a layer 2 switch may be used that has available either programmable hardware such as an FPGA or a custom ASIC for injecting the timestamp. In stage two, a destination switch, also owned by the exchange, would receive all packets addressed to its subnetwork, and extract the originator's timestamp. Using this timestamp and its own timer functionality, the destination switch would then store the packet in its own buffers until the standardized delay has been met before forwarding it on to its ultimate destination. Packets received on different ports on the same clock cycle may be fed into a randomizer function within the switch in order to determine which would be forwarded first. Any packet received by the switch whose latency already exceeds the enforced latency may automatically be forwarded on to its destination at the end of the current send queue. In order to achieve proper parity all between possible connections, cables between servers and origination and destination switches may have to be standardized.

In one embodiment, clocks within each switch may be synchronized to an outside master time source, i.e. a single source of truth for time. To create a time source with the level of precision required a single crystal oscillator may be used whose output is fed into a splitter that feeds to connections to all other switches to drive the timestamping. All connections between the splitter and the switch may also have to be a standardized length.

As used herein, a data transaction message may refer to an electronic financial message or electronic financial data message and may further refer both to messages electronically communicated by market participants to an electronic trading system and vice versa. Data transaction messages communicated to the electronic trading system, also referred to as "inbound" messages, may include request messages, such as trader orders, order modifications, order cancellations and other transaction requests, as well as other message types. Data transaction messages communicated from the electronic trading system, referred to as "outbound" messages, may include messages responsive to inbound messages, such as confirmation and/other response messages, or other messages such as market update messages, quote messages, and the like, e.g. market data messages.

Data transaction messages may further be categorized as having or reflecting an impact on a market, also referred to as an "order book" or "book," for a traded product, such as a prevailing price therefore, etc., or not having or reflecting an impact on a market or a subset or portion thereof. For example, a request to place a trade may result in a response indicative of the trade either being matched with, or being rested on an order book to await, a suitable counter-order. In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein. It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. For example, a particular market data feed may only communicate information related to the top buy/sell prices for a particular product, referred to as "top of book" feed. In this case, a request message may be considered market-impacting only if it affects the top buy/sell prices and otherwise is considered non-market-impacting. As market impacting communications tend to be more important to market participants then non-impacting communications, this separation may reduce congestion and or noise among those communications having or reflecting an impact on a market or portion thereof.

Market data feeds may further be characterized as providing a "view" or "overview" of a given market, an aggregation or a portion thereof. For example, a market data feed may convey the entire state of a market for a particular product, e.g. all presently resting buy/sell orders and prices associated therewith as well as trade notifications, etc., only a portion of a market, e.g. only the top 10 resting buy/sell orders, and/or an aggregation of multiple markets or portions thereof. As used herein, a market impacting request may be said to impact the "view" of the market as presented via the market data feed.

Various types of market data feeds may be provided by electronic trading systems, such as the CME, in order to provide different types or subsets of market information or to provide such information in different formats. Examples include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index). It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available of later developed, are contemplated herein.

The disclosed embodiments effectively normalize the transmission latency of, or otherwise impose a minimum latency on, incoming and outgoing transaction messages, i.e. orders and market data updates, received from different sources (via different ingress points and/or internal routing paths) or transmitted to different destinations (via different egress points and/or internal routing paths), by measuring the time it takes a transaction message to transit the network infrastructure between an ingress/egress point of the electronic trading system and the processing component where those transactions will be processed and results thereof generated, i.e. the match engine. That is, the disclosed embodiments normalize, equalize or otherwise level, substantially or otherwise, latencies of network paths which originate from disparate sources and converge at a common destination and/or originate from a common source and diverge to multiple disparate destinations. The measured time is then compared to, for example, a pre-defined minimum latency. If the transit time is less than the minimum latency, the transaction/forwarding is delayed or processing thereof is otherwise deferred, at the processing component or egress point, for a time period equal to the difference. If the transit time is equal to or greater than the minimum latency, in one embodiment, the transaction may be processed/forwarded without delay.

The disclosed embodiments represent a technical solution to a technical problem of communications latency in an electronic communications network where multiple network paths are available to a common destination and that variances in the communications latencies between those paths may create issues for deterministic systems which must process transactions from different sources in a particular order, in order of receipt by the system, and where the results thereof should be received by multiple recipients substantially simultaneously. In particular, inequitable latencies may cause an incoming data transaction message, e.g. a packet, that is forwarded to a common destination subsequent to another message/packet, to arrive first at the destination, i.e. before the message/packet which was sent first, where those messages/packets are communicated, for example, via different network paths to the common destination. The receipt of these messages/packets out of order may cause issues for deterministic processing systems if those messages were to be processed out of order. Where an outgoing message is intended for multiple recipients, inequitable latencies may result in one recipient receiving the message before another creating an information advantage.

The term "transaction processing system" may refer to the overall system including the ingress and egress points, destination/processing component, e.g. match engine, and intervening/interconnecting network infrastructure. As will be described in more detail below, for clarity the timing of the receipt of a transaction message at an ingress point to the transaction processing system as compared to receipt of another transaction message at the same or a different ingress point may be characterized as the time it is forwarded by the receiving ingress point along a network path toward the destination, assuming the ingress point forwards received messages substantially upon receipt. Similarly, the timing of an outgoing message may be characterized by the time it is forwarded from the processing component along one or more networks paths towards the egress points. At the destination/processing component, i.e. the match engine or point where the transaction messages will be processed or egress point where the message will be forwarded outside of the transaction processing system, the time of receipt thereby of forwarded messages will be characterized as their time/order of receipt. Accordingly, the term "forwarding" refers to the receipt and subsequent transmission of a transaction message along a network path toward the destination/processing component and the forwarding of a first transaction message prior to the forwarding of a second transaction message implies, for example, that the first transaction message was received at an ingress point prior to the second transaction having been received at the same or a different ingress point. However, as will be described, the order in which transaction messages are forwarded may not be the same as the order in which those transaction messages are received at the destination/processing component.

Generally, deterministic processing refers to a system where the result of processing multiple transactions may depend on the order in which those transactions are processed, i.e. if processed in a different order, a different result will be obtained. Mathematical computations, in particular having nested calculations, decision making algorithms, interdependent tasks, etc. may be examples of deterministic processes. As described above, as used herein a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real time processing.

For example, wherein the business rules define a first-in-first-out ("FIFO") process for matching offers with counter-offers to effect an exchange or trade, when an offer transaction is received to which no prior counter offer transaction has been previously received, it should be matched with the next suitable counter offer transaction received rather than a later received counter offer transactions. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g. market, or changes thereto, in which the business transactions are transacted should present an accurate reflection of the actual state or state change in accordance with the defined business rules, so as to not mislead participants or provide an unfair advantage. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith. Regardless of the nature of the underlying transactions, e.g. business/finance related or not, it will be appreciated that deterministic processing is a technical function describing how a processing system is to process multiple transactions.

It will be understood that current network infrastructures may be adequate for use in non-deterministic systems where the order of processing incoming transactions does not affect the processing results, or in systems which process messages from a single source where those message contain an inherent or explicit ordering which may be relied upon by the transaction processing system. For example, standard TCP/IP messaging is designed for multi-path networks which do not guarantee arrival order of a given set of messages, e.g. packet switched networks. TCP/IP utilizes message ordering, where upon transmission, messages include data indicative of their ordering with respect to other messages transmitted by the same source. This ordering data enables the receiving device to assemble a set of messages in the order they were transmitted as they are received regardless of their order of arrival.

However, the disclosed embodiments may be applicable to multi-source deterministic systems where the processing result is dependent upon the order in which transactions are processed and where those transaction messages are transmitted by different sources reliant upon their arrival time at the transaction processing system, but not necessarily the order of arrival at the actual processing component thereof, to determine their processing priority/order.

Differences in latency as between two different network paths to a common destination may be caused by static differences, dynamic differences or a combination thereof, in the network infrastructure which makes up those network paths, e.g. network switches, wires, wireless connections, etc. Static differences include: media type/characteristics such as cat6 copper cable, fiber optic, satellite, microwave or Wi-Fi; cable length/impedance where a longer and/or higher impedance cable requires a longer time to transit than a shorter and/or lower impedance cable of the same type; number, type and capability of routing and switching devices along the path which impart processing delay to perform their functions; transceivers which transfer/translate messages between different media such as between copper, fiber and wireless media, etc. Generally, static differences are differences which do not change over time, e.g. delays attributable to static characteristics of the network infrastructure. Dynamic differences include: network load where increased network traffic/congestion may increase latency; interference such as radio frequency interference, sunspots, etc. which may cause errors and retries in the transmission; equipment/media degradation or mechanical issues such as temperature/environmental sensitivity, poor connections or degraded components which may impart transmission errors or intermittent or varying changes in impedance, capacitive and/or resistive delay, etc. Generally, dynamic latency differences vary over time and may or may not be predictable. Given dynamic latency variations, a network path that has a higher latency as compared to another network path at a particular time may have a lower latency at another time. Dynamic latencies may affect different messages along the same path where, not only may one message transit the network path faster than another message, but one message may overtake another message in transit such as where an earlier forwarded message must be resent by intermediate network component due to an intermittent error and where the earlier message is resent after a later forwarded message is communicated by that intermediate network component.

It will be appreciated that static latency differences may be addressed by measuring the latency variances among the different network paths and physically or logically statically compensating for those difference such as by adding an additional length of cable or an electronic fixed delay buffer along a lower latency path to equalize that path to a longer latency path. Alternatively, slower network infrastructure components may be replaced with faster component to decrease latency commensurate with another network path. While some dynamic latency issues may be mitigated using static changes, such as replacing interference-susceptible components with shielded components, implementing proper maintenance and upkeep, etc., it will be appreciated that given the nature of dynamic latencies, such latencies cannot be completely addressed in this manner.

The disclosed embodiments, while directed primarily at compensating for dynamic network path variances, also by their operation, are able to address static variances as well and, thereby, may simplify compensation of such static differences by obviating the need to add additional media or equipment in order to equalize static differences. This may reduce cost as well as complexity of the network infrastructure and increase fault tolerance by minimizing unnecessary potential points of failure. It will be appreciated then that the disclosed embodiments may be used alone or in conjunction with other methods of compensating for static latency variances.

Other solutions to the issue of ensuring deterministic processing of transactions received over multiple latency-variant paths include merely ascribing a time-stamp to incoming transactions messages of their time of receipt prior to forwarding them to the transaction processing system along the particular network path. The time stamp, ideally, permits the transaction processing system, upon receipt at an ingress point, to determine the order of receipt of those messages and process them in accordance therewith. However, if a transaction message is delayed in transit from the ingress point to the processing component such that the processing component first received a later forwarded transaction message which arrived more quickly, the transaction processing component may not be aware that earlier forwarded message, which is still in transit, exists and it may then proceed to process the later forwarded message first.

The disclosed embodiments, instead, impose a minimum delay on all incoming and outgoing transactions messages, normalizing any delay in transit across all of the network paths to the destination and, thereby allowing earlier forwarded but delayed transaction messages to reach the transaction processing system before a later forwarded but non-delayed messages are processed. It will be appreciated that by sizing the minimum delay appropriately or otherwise dynamically adjusting the minimum delay based on network conditions, as will be described, the ability for a later forwarded transaction message to overtake or otherwise be processed/transmitted before an earlier forwarded transaction message, along the same or different network path, is minimized if not eliminated.

As compared to routing all transaction messages through a single ingress/egress point and network path to/from the transaction processing component, which is a solution which may guarantee that, regardless of latency, messages cannot arrive out of order, it will be further appreciated that the disclosed embodiments, by maintaining multiple ingress/egress points and paths to/from the transaction processing system, may be advantageous. For example, offering multiple paths may minimize congestion along any one path, balance load among those paths, provide geographically/physically convenient ingress/egress points for incoming/outgoing transaction messages, provide redundancy and fault tolerance, etc. It will be apparent that the disclosed embodiments represent a solution to multi-path latency variance that is significantly more than any previously known implementation.

While the disclosed embodiments may be discussed in relation to futures and/or options on futures trading using a central limit order book ("CLOB"), it will be appreciated that the disclosed embodiments may be applicable to any financial instrument, e.g. equity, options or futures, trading system or market now available or later developed, which may use a CLOB, a Request for Quote or other methodology. A CLOB is a trading method used by most exchanges globally. It is a transparent system that matches customer orders (e.g. bids and offers) on a 'price time priority' basis. The highest ("best") bid order and the lowest ("cheapest") offer order constitutes the best market or "the touch" in a given security or swap contract. Customers can routinely cross the bid/ask spread to effect low cost execution. They also can see market depth or the "stack" in which customers can view bid orders for various sizes and prices on one side vs. viewing offer orders at various sizes and prices on the other side. The CLOB is by definition fully transparent, real-time, anonymous and low cost in execution. In the CLOB model, customers can trade directly with dealers, dealers can trade with other dealers, and importantly, customers can trade directly with other customers anonymously. In contrast to the CLOB approach, the RFQ trading method is an asymmetric trade execution model. In this method, a customer queries a finite set of participant market makers who quote a bid/offer ("a market") to the customer. The customer may only "hit the bid" (sell to the highest bidder) or "lift the offer" (buy from the cheapest seller). The customer is prohibited from stepping inside the bid/ask spread and thereby reducing its execution fees. Contrary to the CLOB model, customers can only trade with dealers. They cannot trade with other customers, and importantly, they cannot make markets themselves.

A limit order is an order to buy a security at no more than a specific price, or to sell a security at no less than a specific price (called "or better" for either direction). This gives the trader (customer) control over the price at which the trade is executed; however, the order may never be executed ("filled"). Limit orders are used when the trader wishes to control price rather than certainty of execution. A market order is a buy or sell order to be executed immediately at current market prices. As long as there are willing sellers and buyers, market orders are filled. Market orders are therefore used when certainty of execution is a priority over price of execution. A conditional order is any order other than a limit order which is executed only when a specific condition is satisfied, such as a stop or stop-loss order which is an order to buy or sell a stock once the price of the stock reaches a specified price.

As was described above, an order to trade, whether it be a limit order, market order, conditional order or some other order type, may be considered a business transaction, i.e. one or more operations or acts which implement one or more business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the business rules, may be deterministic in that they must occur, or be processed, in an (temporal) order and/or in real time as defined by business rules and/or to effect the business/commercial purpose or meet participant expectations. It will be appreciated that such deterministic processing may, in fact, result in out of order processing depending on the business rules, such as where conditions for processing orders are imposed which may not be met by an earlier transaction before a later transaction. Deterministic order may be paramount. Real time processing may be secondary. For example, when an offer transaction is received to which a prior offer transaction counter thereto has not been previously received, it should be matched with the next offer transaction received counter thereto (in a FIFO market). However, if the earlier offer transaction specifies a condition, such as that it must be completely filled or not at all, it may be deferred in favor of a later arriving offer transaction when the condition is not met. As was discussed above, the representation (but not, perhaps, the perception) of the current state of the business environment, e.g. market, in which the business transactions are transacted, or changes therein, should present an accurate reflection of the actual state or state change so as to not mislead participants or provide an unfair advantage.

An exemplary trading network environment including the disclosed electronic trading system 100 is shown in FIG. 1. In the exemplary environment, the electronic trading system 100 receives orders and transmits market data, e.g. related to orders and trades, to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

As will be described in detail below, the electronic trading system 100 may be physically implemented with one or more mainframe, desktop or other computers, such as the computer 400 described below with respect to FIG. 4, reconfigurable logic components, network switches, gateways, routers and other communications devices operative to facilitate communications within the electronic trading system 100 and between the electronic trading system 100 and the market participants. Logically, as depicted in FIG. 1, the electronic trading system 100 implements numerous functions/functional modules each of which, as will be described, may be implemented in software, hardware or a combination thereof, as single standalone component or combination of interconnected components or in combination with another function/functional module. Furthermore, each module/component may be implemented as its own sub-network or subnet within the overall logical and/or physical network infrastructure upon which the electronic trading system 100 is implemented.

It will be appreciated that identifying and defining the boundaries of an inter-networked communications system, the internal components thereof being interconnected as well, such as between the electronic trading system 100 and market participants and the infrastructure which allows communications there between, may be complex. Physically, the various network device, e.g. switches, gateways, routers, and the cabling and connections there between, may be owned, leased and/or controlled by different entities, as well as physically located in disparate geographic locations which may be geographically proximate to, or remote from, the entity which owns, leases or controls the network device. In some cases, a network device owned and operated by a service provider may be physically located within the premises of an entity to which the services are provided or, alternatively, the network device owned and operated by the service recipient may be physically located within the premises of the service provider, both situations being referred to as co-location. Logically, the paths, and the boundaries there between, over which transactions flow and the boundaries between entities may be more difficult to discern.

Accordingly, as generally used herein, the electronic trading system 100, or the components or boundaries thereof, may be defined in numerous ways. In particular, the physical electronic trading system 100 may be defined by the entity, e.g. CME Group, which defines the business rules for processing trading transactions and which owns or otherwise controls the components which implement those rules, wherever those components may be geographically located. The logical boundaries of the electronic trading system 100, which may also be referred to as the points of ingress/egress, demarcation point or edge 142, may be defined as the first, or last, point at which the electronic trading system 100 can control or otherwise manipulate an incoming, or outgoing, transmission, e.g. data message or packet. For example, for an outgoing data packet, the edge 142 of the electronic trading system 100 may be defined as the last point at which the electronic trading system 100, or component thereof, can recall or otherwise stop the transmission. For an incoming data packet, the edge 142 of the electronic trading system 100 may be defined as the first point at which the electronic trading system 100, or component thereof, becomes aware of the existence of the data packet. For example, the demarcation point or edge 142 may be the point at which a market data message is provided to the multi-casting protocol for transmission or other point where data packets are individually forwarded toward their respective destinations, e.g. individually distinguishable by destination address. In at least one disclosed embodiment, the edge or demarcation point 142 may further be defined as the point at which data messages or packets destined for multiple market participants are transmitted simultaneously, or substantially simultaneously, i.e. transmitted within short a time period such that an observer would consider them simultaneously transmitted or otherwise find the difference there between practically, logically or physically imperceptible. Thereafter, variation in network path latencies, etc. may impart unequal delays on the delivery of those messages.

Generally, the edge 142 will lie between a component of the electronic trading system 100, such as a router or gateway device (not shown), and a component, such as a server computer, router or gateway device (not shown), controlled by another entity, such as an Internet Service Provider, a customer of the electronic trading system 100 (in the case of colocation) or other operator of the LAN 124 or WAN 126 shown in FIG. 1. As described above, the edge or demarcation point 142, or portions thereof, may be geographically located anywhere, e.g. it may be geographically proximate to or remote from the other components/modules of the electronic trading system 100. In some embodiments, market participants may co-locate devices for receiving data from, and sending data/transactions to, the electronic trading system 100 in the same geographic location as the components of the electronic trading system 100 which transmit that data.

Referring back to FIG. 1, functions/functional modules of the electronic trading system 100 may include a user database 102, stored in a memory other storage component, e.g. see the description below with respect to FIG. 4, which includes information identifying market participants, e.g. traders, brokers, etc., and other users of electronic trading system 100, such as account numbers or identifiers, user names and passwords. An account data function 104 may be provided which may process account information that may be used during the matching and trading process, such as processing trading fees or maintaining credit limits, etc. A match engine function 106, described in detail below, may be included to receive incoming transactions and access order books, such as may be stored in the order book function 110, and match incoming and resting transactions, such as bid and offer prices, and generate data messages indicative thereof, and may be implemented with software that executes one or more algorithms for matching bids and offers, e.g. FIFO, pro rata, etc. A trade database 108, stored in a memory or other storage medium, may be included to store information identifying trades and descriptions of trades. In particular, a trade database may store information identifying the time that a trade took place and the contract price. An order book function 110 may be included to store resting offers to buy or sell for the various products traded on the exchanges and to compute or otherwise determine current bid and offer prices for those products. A market data function 112 may be included to collect market data, such as from the order book function 110 and/or match engine function 106, and prepare the data for transmission to market participants. A risk management function 134 may be included to compute and determine a user's risk utilization in relation to the user's defined risk thresholds, i.e. implement credit controls as will be described. An order processing function 136 may be included to decompose delta based and bulk order types for processing by the order book function 110 and/or match engine function 106. A volume control function 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the electronic trading system 100 components, including the user database 102, the account data function 104, the match engine function 106, the trade database 108, the order book function 110, the market data function 112, the risk management function 134, the order processing function 136, or other component or function of the electronic trading system 100.

Each of the modules described above may be implemented as a separate hardware and/or software component alone or in combination with another of the described modules. Each may further be implemented in a subnetwork of the electronic trading system 100 network architecture and interconnected with each other and with the edge 142 of the electronic trading system 100 via an electronic network infrastructure, as described, which provides for one or more network communication paths between each point of ingress/egress and each module and, in particular, at least multiple of such paths.

The trading network environment shown in FIG. 1 includes exemplary computer devices 114, 116, 118, 120 and 122 which depict different exemplary methods or media by which a computer device may be coupled with, either directly or indirectly, the electronic trading system 100 or by which a user may communicate, e.g. send and receive, trade or other information therewith, i.e. via an ingress/egress point/the edge 142. It will be appreciated that the types of computer devices deployed by market participants and the methods and media by which they communicate with the electronic trading system 100, or otherwise reach or connect with the edge 142 of the electronic trading system 100, is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the electronic trading system 100. Depending on the type of computer device, a user can interact with the computer with a keyboard, pointing device, microphone, pen device or other input device now available or later developed.

An exemplary computer device 114 is shown directly connected to the edge 142 of the electronic trading system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the electronic trading system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computers and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based computer device, or other wireless device, may communicate with the LAN 124 and/or the Internet 126 via radio waves, such as via Wi-Fi, Bluetooth and/or a cellular telephone based data communications protocol. PDA 122 may also communicate with electronic trading system 100 via a conventional wireless hub 128.

FIG. 1 also shows the LAN 124 coupled with a wide area network ("WAN") 126, such as via a network gateway or router (not shown), which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users, i.e. the market participants, of the electronic trading system 100 may include one or more market makers 130 which may maintain a market by providing constant bid and offer prices for a derivative or security to the electronic trading system 100, such as via one of the exemplary computer devices depicted. The electronic trading system 100 may also exchange information with other trade engines, such as trade engine 138. One skilled in the art will appreciate that numerous additional computers and systems may be coupled to electronic trading system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to the electronic trading system 100. In another example, the exemplary computer device 118 may include computer-executable instructions for receiving market data from the electronic trading system 100 and displaying that information to a user.

Of course, numerous additional servers, computers, handheld devices, personal digital assistants, telephones and other devices may also be connected to the electronic trading system 100. Moreover, one skilled in the art will appreciate that the topology shown in FIG. 1 is merely an example and that the components shown in FIG. 1 may include other components not shown and be connected by numerous alternative topologies.

Electronic trading systems, as will be described, are implemented using computer technology, e.g. processors, memories, electronic communications networks, and the like. As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory To improve performance and volume, merely implementing existing systems using newer and faster general-purpose technology may be insufficient. General purpose processors, operating systems and compilers implement general optimizations and operations designed to improve performance and reliability while maintaining broad applicability across a wide variety of applications. As such, these optimizations are not necessarily optimized for any one application, e.g. such as for implementing a match engine of an electronic trading system. These optimizations, which are largely defined by the manufacturer and may be out of the control of an application developer, may include interrupt handling algorithms, algorithms to improve multitasking, memory management algorithms, pre-fetching, branch prediction, program code optimizations, etc. However, such optimizations may, in fact, undermine the application for which the general-purpose processor is being used. In particular, with respect to the business transactions processed by an electronic trading system, where transactional determinism is paramount, underlying optimizations may be disruptive thereof.

Alternatively, as will be described, the embodiments described below may be implemented using FPGA's or other reconfigurable logic. Implementing processing tasks and algorithms using an FPGA can yield significant performance enhancements over implementations using traditional microprocessors and operating systems. In particular, an FPGA based system implementation may avoid the processing overhead and uncontrollable/unnecessary optimizations implemented by general purpose processors, compilers, operating systems and communications protocols, as well as the security vulnerabilities thereof. For example, an FPGA may avoid interrupt handling, error correction, pre-fetching and other unnecessary microprocessor operations/optimizations, as well as generic processing/housekeeping tasks of the operating system which are not needed, such as garbage collection, unnecessary memory swaps, cache loads, task switching, cycle stealing, etc. Further an FPGA implementation may avoid the use of general purpose compilers which may introduce, for example, undesired program code optimizations.

For example, using an FPGA based implementation may permit components of a trading system to be collocated, such as via a custom interface, or otherwise closely interconnected with networking equipment, such as a router or switch, e.g. via a backplane thereof. This would allow the trading system to have access to incoming transactions as quickly as possible and avoid the latency introduced, not only by having to route the transaction over conventional networking media, but also by the communications protocols, e.g. Transport Control Protocol ("TCP"), used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable trading platform under the supervision of a host CPU. Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

However, merely increasing operating performance, whether via an improved general purpose processor or via an FPGA based implementation, may expose, or reduce tolerance of, fundamental flaws of traditional computer hardware, operating systems or the algorithms/programs implemented thereon, as well as network interconnects/communications media. Such flaws, which may result in non-deterministic operation, include manufacturing imperfections/variabilities (clock skew, long paths, Resistance/Capacitance ("RC") delay, alpha particles, etc.), susceptibility to environmental conditions or changes thereto (temperature, humidity, solar flares, etc.), and human error (intermittent or loose connections, improper configuration, etc.). These flaws may introduce transient errors, such as race conditions, bit errors or packet loss, which affect deterministic operation. These issue may be compounded in a multiprocessor (whether distributed or co-located, e.g. in the same room, the same box, the same package, or on the same substrate) environment, which is desirable for fault tolerance and/or improved performance, where new interconnects and imperfections/variabilities are introduced/multiplied, interconnects are longer (increasing the occurrence of race conditions and/or jitter, i.e. variability over time of communications latency), coherence issues are introduced necessitating complex coherency management mechanisms (thread or resource locking, etc.), and resource (data, memory, bus) contention or conflicts may occur.

Furthermore, mere improvements to performance can reveal problems with the applications themselves, such as trading applications or their underlying algorithms. For example, an increase in the rate of transaction processing may cause variances/divergence, between actual operation and ideal or expected operation, to emerge, be amplified, exacerbated (possibly exploited) or compounded beyond an acceptable level, e.g. before the application can be reset or other corrective action taken. In particular, deficiencies with assumptions, e.g. factors thought to be negligible or at least acceptable, may become significant, such as the assumed requisite degree of precision or rounding, assumed number decimal places, assumed number of bits (which may cause overflow), assumed or limited precision constants or variables (e.g. a time variable incapable of nanosecond or other requisite precision), factors assumed to be constant which are in fact variable, variables ignored for convenience or to reduce complexity, tradeoffs and compromises (made for convenience/to reduce cost/complexity or improve performance of the implementation). Further, the occurrence of unaccounted for, or intentionally ignored, assumed-statistically-insignificant events/factors, variables, rounding errors, corner cases, rare or unexpected/unanticipated states or state transitions may present an increasing risk. Generally, speed becomes a lens which creates, or magnifies/reveals underlying, defects and/or divergences, e.g. where a later transaction may overtake an earlier transaction (race condition), as well as limits recovery time from, or otherwise reduces tolerance for, errors (transient or systemic (delay) such as bit errors, packet loss, etc.). Such flaws may cause inconsistencies and/or may be unfairly exploited.

Accordingly, beyond mere performance improvements, improved architectures and algorithms for implementing electronic trading systems may be needed to ensure proper, e.g. transactionally deterministic, operation by avoiding optimizations and operations which may undermine intended operation and avoid, account and/or compensate for performance related/introduced/revealed inadequacies.

The disclosed architecture for normalizing latency variations, and implementations thereof, described in detail below, facilitate improved, e.g. low latency and high volume, transactional performance and fault tolerance with assured transactional determinism, while further enabling additional value-added functionality to improve information outflow, trading opportunities, e.g. the ease with which trades can occur or liquidity, risk mitigation and market protections, as will be described below.

In the exemplary embodiments, incoming data transaction messages are ultimately received at the electronic trading system 100 via one of set of ingress points, and outgoing data transaction messages ultimately leave the electronic trading system 100 at via one of a set of egress points, at the edge 142 of the electronic trading system 100, each ingress/egress point generally defining a single point of entry/exit, i.e. a single communications interface, at which the disclosed embodiments apply determinism, which as described is moved away from the point where matching occurs and closer to the point where the electronic trading system first becomes "aware" of the incoming transaction or last controls an outgoing message. This may require improving the performance of this communications interface to process the influx of transactions/outflux of messages without being overwhelmed. As described herein, in some implementations, more data transaction messages/orders may be submitted by market participants via more ingress points and more messages may be communicated to market participants via more egress points, i.e. parallel inputs/channels/communications pathways implemented to increase capacity and/or reduce resource contention. However, for many of the reasons described above, parallel communication paths complicate deterministic behavior, e.g. by creating opportunity, such a via asymmetric latencies/delays among communications paths, for later transmitted or arriving transactions to overtake earlier arriving or transmitted transactions and for inequities in the receipt of messages, and may require mechanisms to discriminate among closely received transactions and arbitrate among simultaneously, or substantially simultaneously, received transactions, e.g. transactions received at the same time or received within a threshold of time unresolvable by the system. Accordingly, mechanisms may be implemented to improve and impart deterministic handling of discrimination and arbitration among closely received transactions. In particular, as will be described, the disclosed embodiments mitigate latency disparities by normalizing the latencies among disparate communications paths.

Figure 2:
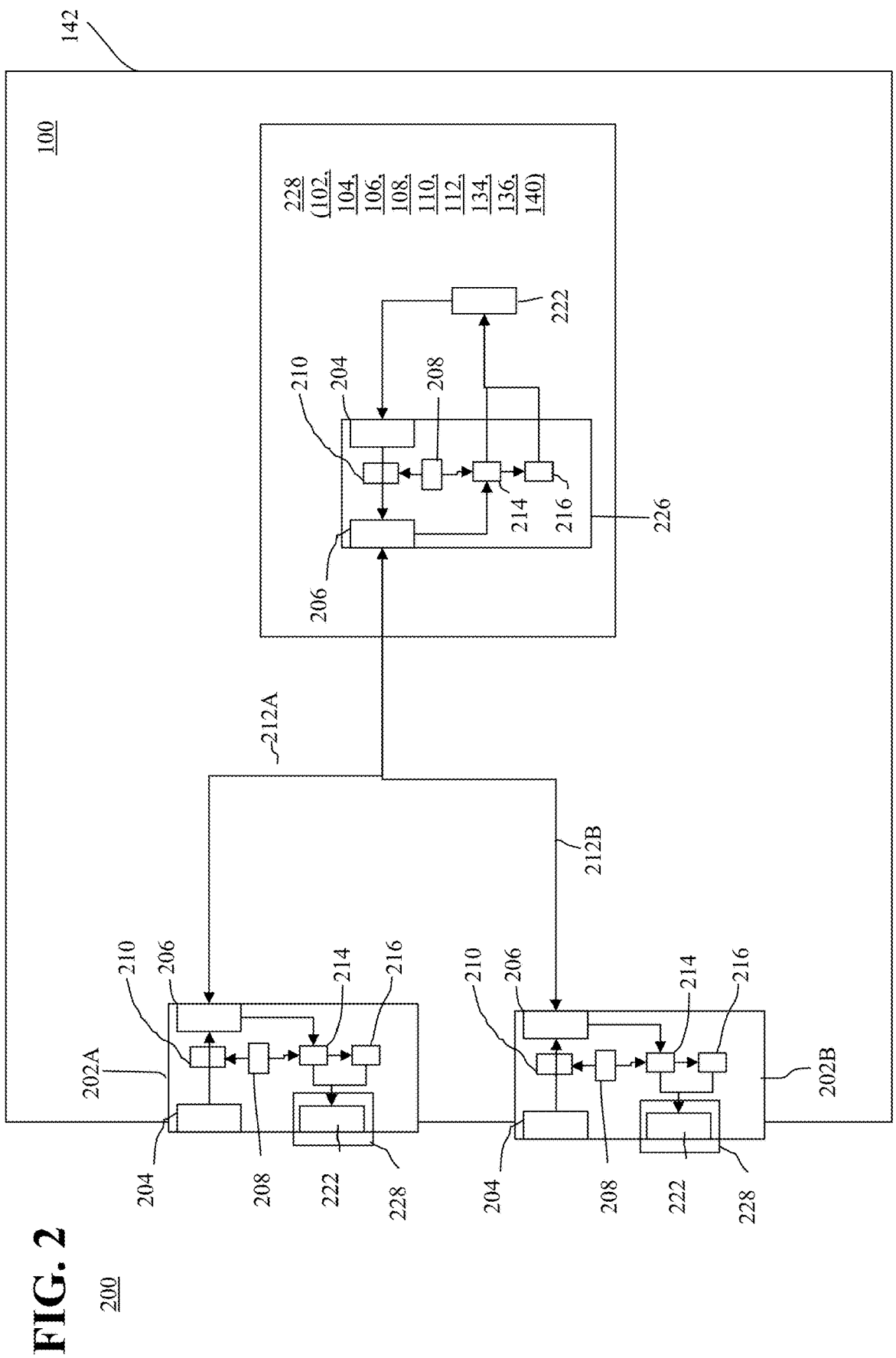
FIG. 2 a block diagram of an exemplary implementation of the system of FIG. 1 according to one embodiment.

In particular, FIG. 2 depicts a block diagram of a transaction processing system 200, which may also be referred to as an architecture, for use with the electronic trading system 100 of FIG. 1 for processing a plurality, e.g. a series or sequence, of incoming data transaction messages comprising, for example, financial transactions, such as orders to trade a financial product, received from various sources, e.g. market participants 204 (traders/trader terminals), via a network, such as the network 126 of FIG. 1 or other method/medium of communicating with the transaction processing system 100 (not shown in FIG. 2), the processing of each transaction operative to cause a change in a current state of an electronic marketplace for one or more financial products and generation of a message comprising a result thereof for transmission to the market participants. In one embodiment, each transaction message may comprise a request to transact, e.g. an order to buy or sell, one or more financial products, or data indicative a result thereof. A request to transact may further comprise a request to cancel a previous transaction, a status inquiry or other transaction.

The system 200 includes a plurality of transaction message receivers 202A, 202B, 226, located at various ingress/egress points along the edge 142 of the electronic trading system 100 as well as associated with each of the processing components, e.g. the internal functional modules 102, 104, 106, 108, 110, 112, 134, 136, 140, of the system 100. Each transaction message receiver 202A, 202B, 226 may be implemented by a network switch, router, gateway or other device used to interconnect electronic communications networks. Further, each transaction message receiver 202A, 202B, 226 may be implemented as one or more logic components such as on an FPGA which may include a memory or reconfigurable component to store logic and processing component to execute the stored logic, coupled with the network 126 (not shown), and operative to receive each of the plurality of data transaction messages therefrom. It will be appreciated that each of the transaction message receivers 202A, 202B, 226 may be located in a logical and/or physical, e.g. geographic, location that is different from another of the transaction message receivers 202A, 202B, 226, as well as the processing component 222.

In particular, the transaction processing system 100 for processing a data transaction message, of a plurality of data transaction messages, by a transaction processor 228, further includes: a plurality of message receivers 202A 202B 226 coupled with the transaction processing system 100, each of the plurality message receivers 202a 202B 226 being characterized by a transmission latency from the message receiver 202A 226 to another of the plurality of message receivers 202A 226, at least one of the plurality of message receivers 202A 202B 226 being coupled with a transaction processor 228; and wherein each message receiver 202A 202B 226 of the plurality of message receivers 202A 202B 226 is configured to receive, such as via a network interface 204, a data transaction message of the plurality of data transaction messages, augment, such as by using a clock 208 and packet modifier 210, the data transaction message with data indicative of a time of receipt by the message receiver 202A 226 and transmit, such as via a network interface 206, the augmented data transaction message to another of the plurality of message receivers 202A 226, such as via the network infrastructure 212 coupled with the interface 206; and wherein a receiving message receiver 202A 226 of the plurality of the message receivers 202A 202B 226 is further configured to receive, such as via the interface 206, the augmented data transaction message from the transmitting message receiver 202A 226, compute, such as by using a processor 214, based on the data indicative of the time of receipt thereby, e.g. based on clock 208, of the data transaction message, an amount of time elapsed between when the transmitting message receiver 202A 226 received the data transaction message and when the receiving message receiver 202A 226 received the augmented data transaction message from the transmitting message receiver 202A 226, determine a difference, using the processor 214, between the computed amount of time and a defined amount of time, and defer processing, such as by buffering or otherwise delaying 216, of the augmented data transaction message by the transaction processor 228, e.g. the processing component 222 thereof, associated with the receiving message receiver 202A 226 for an amount of time equal to the determined difference when the computed amount of time is less than the defined amount of time. The defined amount of time may be defined is advance as a standard latency/transit time to be applied to all messages as was described above.

In one embodiment, the receiving message receiver 202A 226 is further configured to receive another augmented data transaction message from another message receiver 202B of the plurality of message receivers 202A 202B 226 having a lower transmission latency, the other augmented data transaction message comprising another data transaction message received subsequent to the data transaction message, compute 214, based on the data indicative of the time of receipt thereby of the other data transaction message, another amount of time elapsed between when the other transmitting message receiver 202B received the other data transaction message and when the receiving message receiver 202A 226 received the other augmented data transaction message from the other transmitting message receiver 202B, determine 214 a difference between the computed other amount of time and the defined amount of time, and defer 216 processing of the other augmented data transaction message by the transaction processor 228, e.g. the processing component 222 thereof, associated with the receiving message receiver 202A 226 for an amount of time equal to the determined difference when the computed other amount of time is less than the defined amount of time, wherein the transaction processor 228 associated with the receiving message receiver 202A 226 processes the augmented data transaction message before the other augmented data transaction message.

In one embodiment, the receiving message receiver 202A 226 is further configured to receive another augmented data transaction message from another message receiver 202B of the plurality of message receivers 202A 202B 226 having a lower transmission latency, the other augmented data transaction message comprising another data transaction message received substantially simultaneously with the data transaction message, compute 214, based on the data indicative of the time of receipt thereby of the other data transaction message, another amount of time elapsed between when the other transmitting message receiver 202B received the other data transaction message and when the receiving message receiver 202A 226 received the other augmented data transaction message from the other transmitting message receiver 202B, determine 214 a difference between the computed other amount of time and the defined amount of time, and defer 216 processing of the other augmented data transaction message by the transaction processor 228, e.g. the processing component thereof, associated with the receiving message receiver 202A 226 for an amount of time equal to the determined difference when the computed other amount of time is less than the defined amount of time, wherein the deferrals of the processing of the augmented data transaction message and other augmented data transaction message expire simultaneously, the transaction processor 228 associated with the receiving message receiver 202A 226 being further operative to pseudo randomly select which to process first. In an alternative embodiment, the receiving message receiver 202A 226 determines which to process first.

In one embodiment, if the amount of time is not less than the defined amount of time, the augmented data transaction message is processed upon receipt by the transaction processor 228 associated with the receiving message receiver 202A 226.

In one embodiment, the transmission latency of each message receiver is dynamic.

In one embodiment, the defined amount of time is derived from the transmission latencies of the plurality of message receivers 202A 202B 226. As was described above, the defined amount of time, i.e. the standard latency, may be statically or dynamically defined, as described above.

In one embodiment, at least one of the messages receivers 202A 202B 226 of the plurality of message receivers 202A 202B 226 is located in a geographic region different from a geographic location of another of the plurality of message receivers.

In one embodiment, each of the plurality of message receivers 202A 202B 226 comprises a sub-network coupled with each other via an intermediary network 212.

In one embodiment, the defined amount of time is dynamically defined based on the magnitude of the computed amount of time as compared with other received augmented data transaction messages.

In one embodiment, each of the plurality of message receivers 202A 202B 226 comprises a clock 208, each of the plurality of message receivers being further operative to synchronize their clock to a master clock (not shown). In one embodiment, the master clock comprises a single oscillator crystal coupled with the plurality of message receivers 202A 202B 226 via a splitter. In one embodiment, the master clock may utilize GPS or an atomic clock.

In one embodiment, the transmission latency of each of the plurality of message receivers 202A 202B 226 is dependent upon both the physical distance between the message receivers 202A 202B 226 and a number and type of networking devices (not shown) through, which the augmented data transaction message must transit en route there between.

In one embodiment, each of the plurality of message receivers 202A 202B 226 comprises a layer 2 switch and further wherein each of the plurality of data transaction messages comprises a data packet.

In one embodiment, the transaction processor 228 associated with the receiving message receiver 202A 202B 226 is further operative to process the augmented data transaction message by forwarding the augmented data transaction message to a destination device 222.

In one embodiment, the packet modifier 210 which augments the data transaction messages and/or the processor 214 and delay 216 may be implemented as an FPGA coupled with a network switch. It will be appreciated that the delay 216 which defers processing of the data transaction messages may be implemented as buffer which stores the data transaction message for the requisite amount of time and may comprise a memory with a timer, a series of memories sized to sufficiently delay the data transaction message, other mechanism to introduce a variable delay.

An example of the operation of the disclosed embodiments is shown in the table below. In the example, the standardized/predefined latency is 10 milliseconds:

| Msg | Arrival Time | Path Latency | Arrival at Receiver | Adjustment | Process Time |
| --- | --- | --- | --- | --- | --- |
| 1 | t0 | 3 | t3 | 7 | t10 |
| 2 | t0 | 4 | t4 | 6 | t10 |
| 3 | t1 | 2 | t3 | 8 | t11 |
| 4 | t2 | 1 | t3 | 9 | t12 |

Where the arrival time is the time at which the message arrives at a message receiver 202A 202B 226. The path latency is the latency of the particular network path 212 between the transmitting message receiver 202A 202B 226 and the receiving message receiver 202A 202B 226. The arrival time at the receiver is the time when the receiving message receiver 202A 202B 226 receives the augmented data transaction message from the transmitting message receiver 202A 202B 226. The Adjustment represents how long the processing of the augmented data transaction message will be delayed. The process time is the time when the receiving message receiver 202a 202B 226 forwards the delayed data transaction message for processing.

Figure 3:
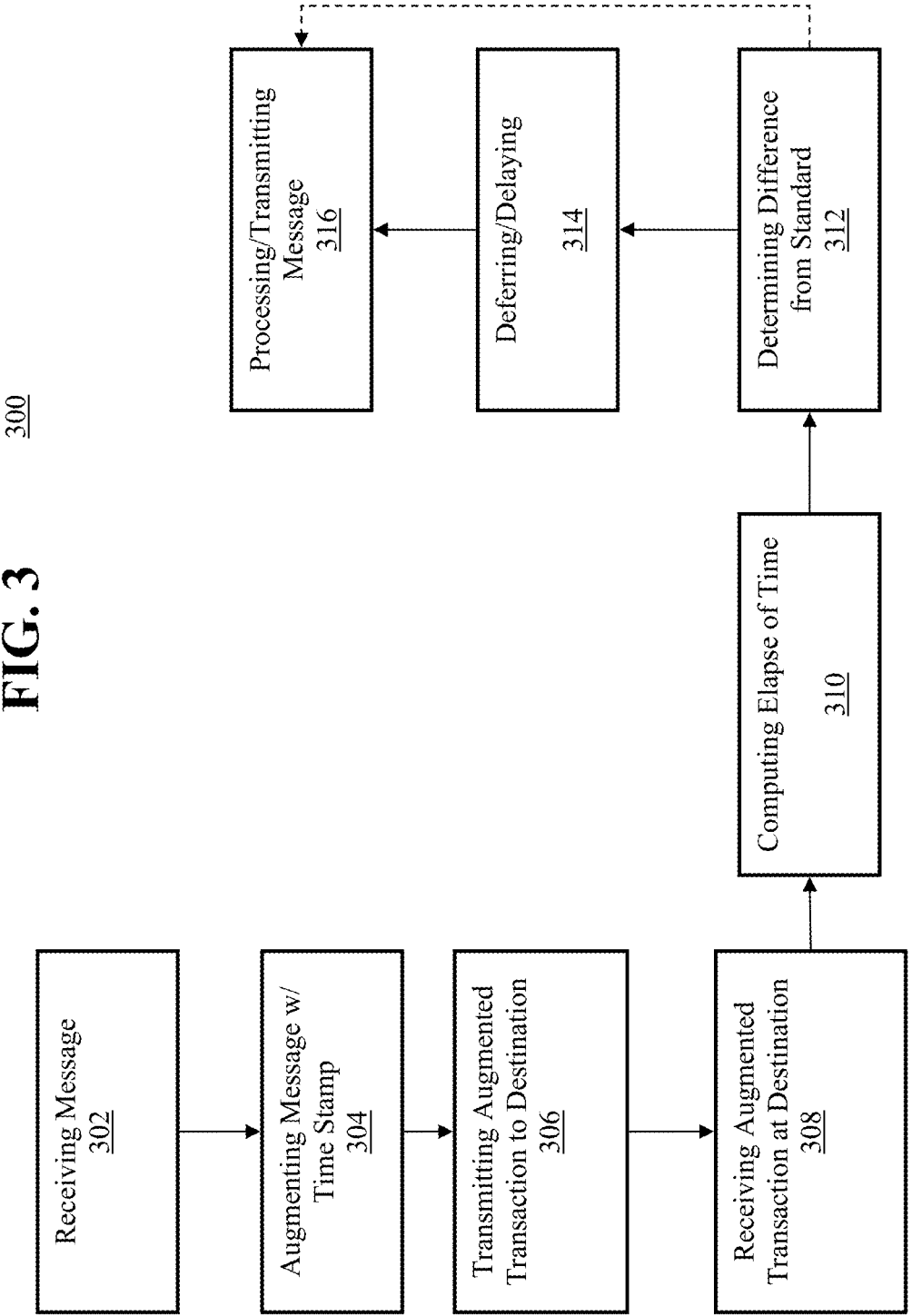
FIG. 3 depicts a flow chart showing operation of the system of FIG. 1 according to one embodiment.

FIG. 3 depicts a flow chart 300 showing operation of the system 200 of FIG. 2. In particular FIG. 3 shows a computer and/or FPGA implemented method of processing a data transaction message, of a plurality of data transaction messages, e.g. data packets comprising orders to trade financial instruments or data indicative of a result thereof, by a transaction processing system 200, of an electronic trading system 100, which receives the data transaction message via one of a plurality of message receivers 202A, 202B, 226 coupled with a processing component/transaction processor 222 of the transaction processing system, e.g. a match engine module 106, network transceiver, etc., each of the plurality message receivers 202A, 202B, 226 being characterized by a transmission latency from the message receiver to another message receiver, i.e. via the network connections 212A, 212B therebetween and the variances in latencies thereof. The transmission latencies of each connection 212A, 212B may comprise a static latency, a dynamic latency or a combination thereof.

As described above, the transaction processor 222 is operative to process the message or content thereof. For message receivers 202A, 202B located at the edge 142 of the trading system 100, the operation of the transaction processor 222 may be to process a data message for transmission outside of the trading system 100, e.g. over the external network coupled therewith at the particular egress point. For example, the operation may include multi-casting the message, etc. For message receivers 226 located in conjunction with the transaction processors 222 which implement the functional modules 102, 104, 106, 108, 110, 112, 134, 136, 140 of the trading system 100, the transaction processor 222 may comprise the components/operations necessary to implement the particular processing function thereof, e.g. matching of transactions, generating market data etc.

The operation of the system 200 comprises: receiving, by a processor 210 of a first message receiver 202A of the plurality of messages receivers 202A, 202B, 226, such as a message receiver 202A located at the edge of the trading system 100 or, alternatively at a message receiver 226 associated with a functional module 102, 104, 106, 108, 110, 112, 134, 136, 140 thereof, a first data transaction message of the plurality of data transaction messages (Block 302); augmenting, by the processor 210 of the first message receiver 202A 226, the first data transaction message with data indicative of a time of receipt by the first message receiver 202A 226 (Block 304); transmitting, by the processor 210 of the first message receiver 202A 226, the augmented first data transaction message to the transaction processor 228 (Block 306), such as via network interface 206 coupled with the network infrastructure 212 of the electronic trading system 100; receiving, by a message receiver 202A 226 associated with the transaction processor 228, the augmented first data transaction message (Block 308); computing, by the message receiver 202A 226 associated with the transaction processor 228 based on the data indicative of the time of receipt by the processor 210 of the first message receiver 202A 226 of the first data transaction message, a first amount of time elapsed between when the processor 210 of the first message receiver 202A 226 received the first data transaction message and when the message receiver 202A 226 associated with the transaction processor 106 received the augmented first data transaction message from the first message receiver 202A 226 (Block 310); determining, by the message receiver 202A 226 of the transaction processor 106, a first difference between the first amount of time and a defined amount of time/standard latency (Block 312); and deferring, by the message receiver 202A 226 of the transaction processor 106, processing of the augmented first data transaction message by the transaction processor 228, e.g. by a processing component 222 thereof, for an amount of time equal to the first difference when the first amount of time is less than the defined amount of time (Block 314).

The operation of the system 200, in one embodiment, may further include receiving, by a processor 210 of a second message receiver 202B of the plurality of messages receivers 202A, 202B, 262, which may be located in a different geographic region than the first message receiver 202A 226 and/or the transaction processor 228, subsequent to the reception of the first data transaction message by the first message receiver 202A 226, a second data transaction message of the plurality of data transaction messages, the transmission latency of the second message receiver 202B being less than the transmission latency of the first message receiver 202A 226; augmenting, by the processor 210 of the second message receiver 202B, the second data transaction message with data indicative of a time of receipt by the second message receiver 202B; transmitting, by the processor 210 of the second message receiver 202B, the augmented second data transaction message to the transaction processor 106; receiving, by the message receiver 202A 226 associated with the transaction processor 228, the augmented second data transaction message prior to receipt thereby of the first augmented data transaction message; computing, by the message receiver 202A 226 associated with the transaction processor 228 based on the data indicative of the time of receipt by the processor 210 of the second message receiver 202B of the second data transaction message, a second amount of time elapsed between when the processor 210 of the second message receiver 202B received the second data transaction message and when the message receiver 202A 226 of the transaction processor 228 received the augmented second data transaction message from the second message receiver 202B; determining, by the message receiver 202A 226 associated with the transaction processor 228, a second difference between the second amount of time and the defined amount of time, the second difference between greater than the first difference; and deferring, by the message receiver 202A 226 associated with the transaction processor 228, processing, e.g. by a processing component 222 thereof, of the augmented second data transaction message by the transaction processor 106 for an amount of time equal to the second difference when the second amount of time is less than the defined amount of time; and wherein the transaction processor 228 processes, e.g. using a processing component 222, the first augmented data transaction message prior to the second augmented data transaction message.

The operation of the system 200, in one embodiment, may further include, if the first amount of time is not less than the defined amount of time, processing, e.g. by the processing component 222, the augmented first data transaction message upon receipt by the transaction processor (Block 316).

In one embodiment, the defined amount of time may be derived from the transmission latencies of the plurality of message receivers.

In one embodiment, each of the plurality of message receivers 202A, 202B, 202C comprises a sub-network coupled together via an intermediary network 212.

In one embodiment, the defined amount of time is dynamically defined based on the magnitude of the first amount of time as compared with other received augmented data transaction messages.

In one embodiment, the processor 210 of each of the plurality of message receivers 202A, 202B, 226 comprises a clock 208, the operation of the system 200 further comprising synchronizing the clocks 208 of the plurality of message receivers 202A, 202B, 226 to a master clock (not shown).

In one embodiment, at least a portion of the transmission latency of each of the plurality of message receivers 202A, 202B, 226 is dependent upon both the physical distance between the message receiver 202A, 202B, 226 and a number and type of networking devices 212A, 212B, 212C through, which the data transaction message must transit en route therebetween.

In one embodiment, each of the plurality of message receivers 202A, 202B, 226 comprises a layer 2 switch and further wherein each of the plurality of data transaction messages comprises a data packet.

The operation of the system 200, in one embodiment, may further include forwarding the augmented first data transaction message to a destination device, such as the processing component 222.

The operation of the system 200, in one embodiment, may further include: receiving, by a processor 210 of a second message receiver 202B of the plurality of messages receivers 202A, 202B, 226, which may be logically and/or physically located in a location different from the first message receiver 202A 226 and/or the transaction processor 228, substantially simultaneously with the reception of the first data transaction message by the first message receiver 202A 226, a second data transaction message of the plurality of data transaction messages, the transmission latency of the second message receiver 202B being less than the transmission latency of the first message receiver 202A 226; augmenting, by the processor 210 of the second message receiver 202B, the second data transaction message with data indicative of a time of receipt by the second message receiver 202B, the time of receipt of the of the second data transaction message being the same as the time of receipt of the first data transaction message; transmitting, by the processor 210 of the second message receiver 202B, the augmented second data transaction message to the transaction processor 228; receiving, by the message receiver 202A 226 associated with the transaction processor 228, the augmented second data transaction message prior to receipt thereby of the first augmented data transaction message; computing, by the message receiver 202A 226 associated with the transaction processor 228 based on the data indicative of the time of receipt by the processor 210 of the second message receiver 202B of the second data transaction message, a second amount of time elapsed between when the processor 210 of the second message receiver 202C received the second data transaction message and when the message receiver 202A 226 associated with the transaction processor 228 received the augmented second data transaction message from the second message receiver 202C; determining, by the message receiver 202A 226 associated with the transaction processor 106, a second difference between the second amount of time and the defined amount of time, the second difference between greater than the first difference; and deferring, by the message receiver 202A 226 associated with the transaction processor 106, processing of the augmented second data transaction message by the transaction processor 106 for an amount of time equal to the second difference when the second amount of time is less than the defined amount of time, both the deferrals of the first and second augmented data transaction messages expiring simultaneously; and selecting pseudo randomly, by the message receiver 202A 226 associated with the transaction processor 228, which of the augmented first and second data transaction messages to process first, e.g. by the processing component 222. It will be appreciated that other selection/arbitration mechanisms may be applied to determine which data transaction message to process first, such as round robin, etc.

While the disclosed embodiments described a symmetric implementation whereby latencies are bidirectionally normalized, e.g. incoming transaction message latencies are normalized to their destination components and outgoing data message latencies are normalized to the system egress points, it will be appreciated that the disclosed embodiments may by asymmetrically implemented where only inbound message latencies or only outbound messages latencies are normalized.

One skilled in the art will appreciate that one or more functions/modules described herein may be implemented using, among other things, a logic component such as a reconfigurable logic component, e.g. an FPGA, which may include a logical processing portion coupled with a memory portion, or as a tangible computer-readable medium comprising computer-executable instructions (e.g., executable software code) executable by a processor coupled therewith to implement the function(s). Alternatively, functions/modules may be implemented as software code, firmware code, hardware, and/or a combination of the aforementioned. For example the functions/modules may be embodied as part of an electronic trading system 100 for financial instruments.

Figure 4:
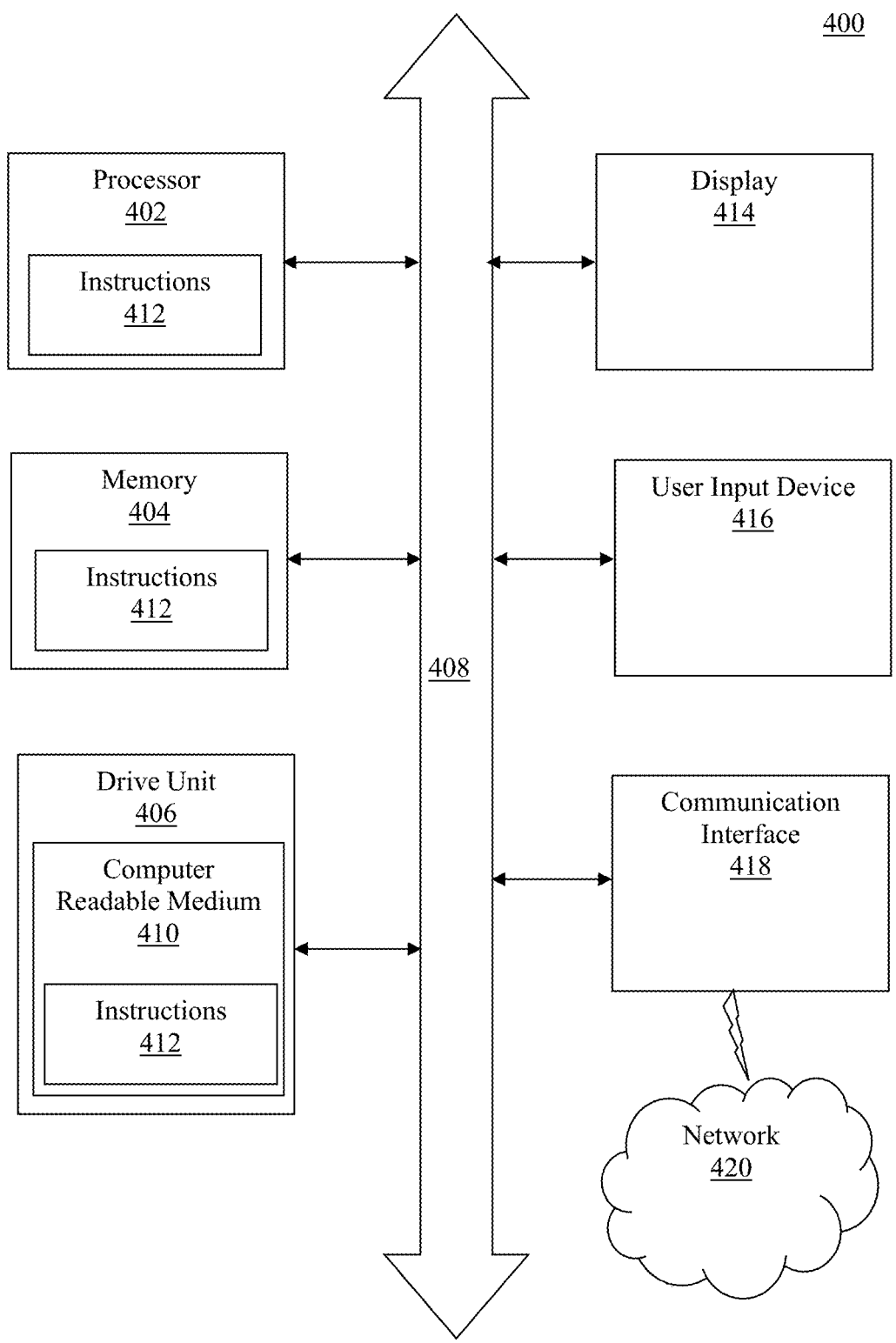
FIG. 4 shows an illustrative embodiment of a general computer system for use with the system of FIGS. 1-3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components of the electronic trading system 100 discussed above may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, as a peer computer system in a peer-to-peer (or distributed) network environment, or as a network device such as a switch, gateway or router. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 may be a memory component of a reconfigurable logic device, e.g. an FPGA. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
receiving, by a first message transceiver of a plurality of message transceivers each operative to perform an action on data transaction messages received thereby, a first data transaction message transmitted to the first message transceiver by another of the plurality of message transceivers, each coupled with the first message transceiver via an electronic communications network path, the first data transaction message having been augmented by the one of the plurality of message transceivers with data indicative of a time of receipt thereby, each of the electronic communications network paths being characterized by a transmission latency;
computing, by the first message transceiver, based on the data indicative of the time of receipt, a first amount of time elapsed between the time of receipt of the first data transaction message and when the first message transceiver received the augmented first data transaction message;
determining, by the first message transceiver, a first difference between the first amount of time and a defined amount of time; and
deferring, by the first message transceiver, performance of the action on the augmented first data transaction message for an amount of time equal to the first difference when the first amount of time is less than the defined amount of time.

2. The computer implemented method of claim 1 further comprising:
receiving, by the first message transceiver prior to receipt thereby of the first augmented data transaction message, an augmented second data transaction message transmitted to the first message transceiver by another of the plurality of message transceivers;
computing, by the first message transceiver, based on the data indicative of the time of receipt, a second amount of time elapsed between the time of receipt of the second data transaction message and when the first message transceiver received the augmented second data transaction message;
determining, by the first message transceiver, a second difference between the second amount of time and the defined amount of time; and
deferring, by the first message transceiver, performance of the action on the augmented second data transaction message for an amount of time equal to the second difference; and
wherein the first message transceiver performs the action on the augmented first data transaction message and the augmented second data transaction message subsequent to the end of their respective deferrals.

3. The computer implemented method of claim 1, wherein, if the first amount of time is not less than the defined amount of time, processing the augmented first data transaction message upon receipt by the first message transceiver.

4. The computer implemented method of claim 1, wherein the transmission latency of each electronic communication network path is static, dynamic or a combination thereof.

5. The computer implemented method of claim 1, wherein the defined amount of time is defined so as to compensate for variations between the transmission latencies of each of the electronic communication network paths.

6. The computer implemented method of claim 1, wherein at least one of the plurality of message transceivers is located in a geographic region different from a geographic location of another of the plurality of message transceivers.

7. The computer implemented method of claim 1, wherein each of the plurality of message transceivers comprises a sub-network coupled with each other via an intermediary network.

8. The computer implemented method of claim 1, wherein the defined amount of time is dynamically defined based on the magnitude of the first amount of time as compared with other received augmented data transaction messages.

9. The computer implemented method of claim 1, wherein each of the plurality of message transceivers comprises a clock, the method comprising synchronizing the clocks of the plurality of message transceivers to a master clock.

10. The computer implemented method of claim 1, wherein the transmission latency of each of the electronic communication network paths is dependent upon the physical distance between each of the plurality message transceivers, a volume of augmented data transaction messages being transmitted and a number and type of networking devices through which each data transaction message must transit en route therebetween.

11. The computer implemented method of claim 1, wherein each of the plurality of message transceivers comprises a layer 2 switch and further wherein each of the plurality of data transaction messages comprises a data packet.

12. The computer implemented of claim 1, wherein each of the plurality of message transceivers comprises a different ingress point of a transaction processing system.

13. The computer implemented method of claim 1, wherein the action further comprises processing the augmented first data transaction message to generate a result, forwarding the augmented first data transaction message to a destination device, or forwarding the result of the processing of the augmented first data transaction message to a destination device.

14. A system comprising:
a first message transceiver of a plurality of message transceiver, each configured to perform an action on data transaction messages received thereby, operative to receive a first data transaction message transmitted to the first message transceiver by another of the plurality of message transceivers, each coupled with the first message transceiver via an electronic communications network path, the first data transaction message having been augmented by the one of the plurality of message transceivers with data indicative of a time of receipt thereby, each of the electronic communications network paths being characterized by a transmission latency;
the first message transceiver being further configured to:
compute, based on the data indicative of the time of receipt, a first amount of time elapsed between the time of receipt of the first data transaction message and when the first message transceiver received the augmented first data transaction message;
determine a first difference between the first amount of time and a defined amount of time; and
defer performance of the action on the augmented first data transaction message for an amount of time equal to the first difference when the first amount of time is less than the defined amount of time.

15. The system of claim 14, wherein the first message transceiver is further configured to:
- receive, prior to receipt thereby of the augmented data transaction message, another augmented data transaction message transmitted to the first message transceiver by one of the plurality of message transceivers;
- compute, based on the data indicative of the time of receipt, a second amount of time elapsed between the time of receipt of the other data transaction message and when the first message transceiver received the other augmented data transaction message;
- determine a second difference between the second amount of time and the defined amount of time; and
- defer performance of the action on the other augmented data transaction message for an amount of time equal to the second difference; and
- wherein the first message transceiver performs the action on the augmented data transaction message and the other augmented data transaction message subsequent to the end of their respective deferrals.

16. The system of claim 14, wherein, if the first amount of time is not less than the defined amount of time, the augmented data transaction message is processed upon receipt by the first message transceiver.

17. The system of claim 14, wherein the transmission latency of each electronic communication network path is static, dynamic or a combination thereof.

18. The system of claim 14, wherein the defined amount of time is defined so as to compensate for variations between the transmission latencies of each of the electronic communication network paths.

19. The system of claim 14, wherein at least one of the plurality of message transceivers is located in a geographic region different from a geographic location of another of the plurality of message transceivers.

20. The system of claim 14, wherein each of the plurality of message transceivers comprises a sub-network coupled with each other via an intermediary network.

21. The system of claim 14, wherein the defined amount of time is dynamically defined based on the magnitude of the computed amount of time as compared with other received augmented data transaction messages.

22. The system of claim 14, wherein each of the plurality of message transceivers comprises a clock, each of the plurality of message transceivers being further operative to synchronize their clock to a master clock.

23. The system of claim 14, wherein the transmission latency of each of the electronic communication network paths is dependent upon both the physical distance between each of the plurality of message transceivers, a volume of augmented data transaction messages being transmitted and a number and type of networking devices through, which each augmented data transaction message must transit en route there between.

24. The system of claim 14, wherein each of the plurality of message transceivers comprises a layer 2 switch and further wherein each of the plurality of data transaction messages comprises a data packet.

25. The system of claim 14, wherein each of the plurality of message transceivers comprises a different ingress point of a transaction processing system.

26. The system of claim 14, wherein the action further comprises processing the augmented first data transaction message to generate a result, forwarding the augmented first data transaction message to a destination device, or forwarding the result of the processing of the augmented first data transaction message to a destination device.

27. A system comprising:
- means for receiving, at a first message transceiver of a plurality of message transceivers each operative to perform an action on data transaction messages received thereby, a first data transaction message transmitted to the first message transceiver by another of the plurality of message transceivers, each coupled with the first message transceiver via an electronic communications network path, the first data transaction message having been augmented by the one of the plurality of message transceivers with data indicative of a time of receipt thereby, each of the electronic communications network paths being characterized by a transmission latency;
- means for computing, by the first message transceiver, based on the data indicative of the time of receipt, a first amount of time elapsed between the time of receipt of the first data transaction message and when the first message transceiver received the augmented first data transaction message;
- means for determining, by the first message transceiver, a first difference between the first amount of time and a defined amount of time; and
- means for deferring, by the first message transceiver, performance of the action on the augmented first data transaction message for an amount of time equal to the first difference when the first amount of time is less than the defined amount of time.

* * * * *